Figure 4:
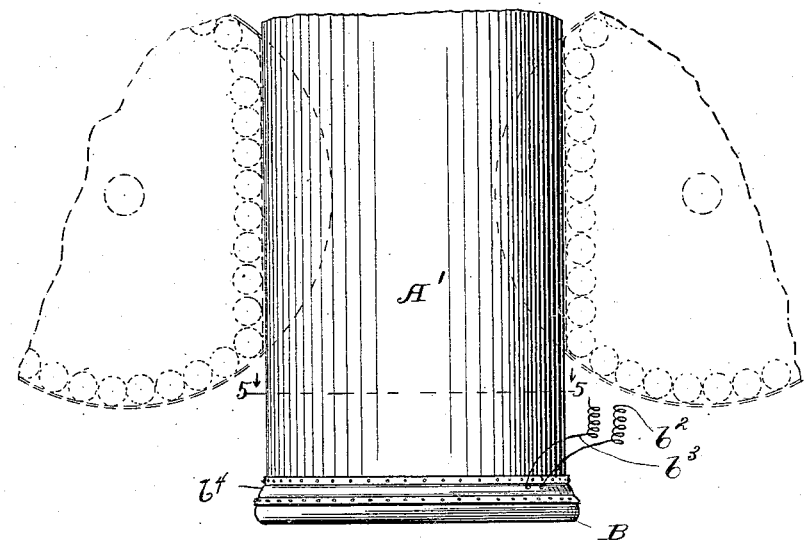

R. L. FRINK.
GLASS BAIT.
APPLICATION FILED MAY 13, 1907.
915,282.
Patented Mar. 16, 1909.
2 SHEETS—SHEET 1.
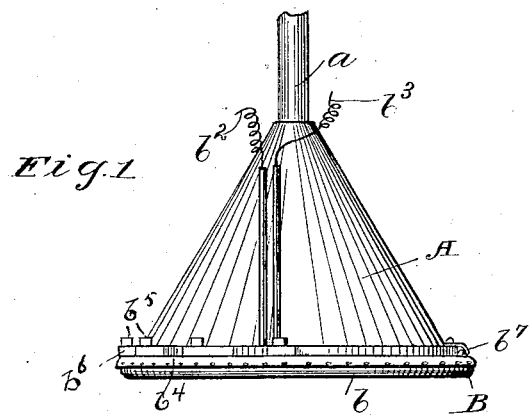
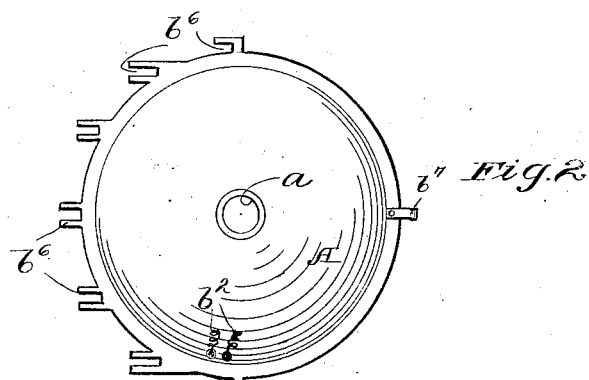
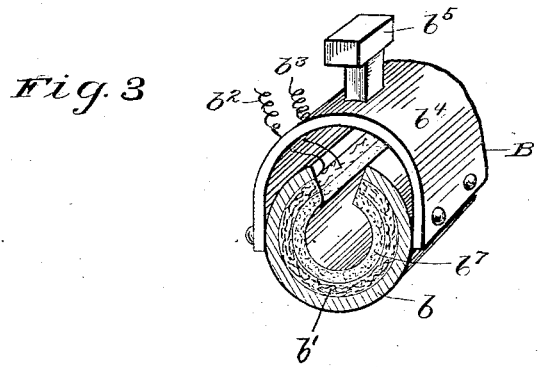
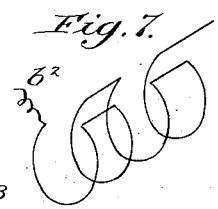
Witnesses:
E. R. Rodd.
Jno. F. Oberlin.
Inventor:
Robert L. Frink
by J. B. Fay
his attorney.

R. L. FRINK.
GLASS BAIT.
APPLICATION FILED MAY 13, 1907.

915,282.

Patented Mar. 16, 1909.
2 SHEETS—SHEET 2.

Witnesses:
D. T. Davies
Jno. F. Oberlin

Inventor:
Robert L. Frink
by J. B. Fay
his attorney

UNITED STATES PATENT OFFICE.

ROBERT L. FRINK, OF CLEVELAND, OHIO.

GLASS-BAIT.

No. 915,282.  Specification of Letters Patent.  Patented March 16, 1909.

Application filed May 13, 1907. Serial No. 373,215.

*To all whom it may concern:*

Be it known that I, ROBERT L. FRINK, a citizen of the United States, resident of Cleveland, county of Cuyahoga, and State of Ohio, have invented a new and useful Improvement in Glass-Baits, of which the following is a specification, the principle of the invention being herein explained and the best mode in which I have contemplated applying that principle, so as to distinguish it from other inventions.

My present invention has regard to improvements in apparatus for drawing glass, particularly glass cylinders in the manufacture of sheet or window glass. It will be obvious, however, that the general features of construction embodied in my improved apparatus may be beneficially adopted in other analogous situations.

The more especial object of the invention is to provide a bait for use in apparatus of this sort that will be free from the numerous difficulties attending the use of baits of the style at present employed, and that will hence materially facilitate the drawing of the glass and also reduce the loss incident to irregular cap-formation and the numerous other troubles incident to prevailing methods or apparatus.

To the accomplishment of these and related objects, said invention consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 5:
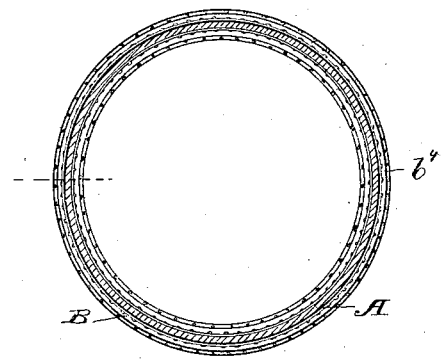
Figure 6:
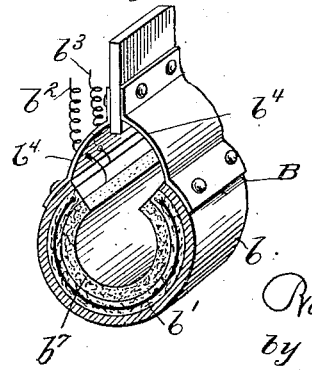

In said annexed drawings:—Figure 1 represents a side elevation of a glass bait embodying the several improvements constituting my invention; Fig. 2 is a plan view of the hood forming one feature of such bait's construction; Fig. 3 is a broken detail, in perspective, of the bait proper; Fig. 4 is a side elevation, corresponding to that in Fig. 1, of a slightly modified form of bait; Fig. 5 is a bottom plan view of the same; Fig. 6 is a broken perspective view of a detail of the bait member proper, as in Fig. 3; and Fig. 7 is a broken perspective view representing the disposition of the heating electric coil within the intermediate layer entering into the construction of the bait member proper.

The two forms of my invention shown in the above drawings to which descriptive reference has just been made, are designed respectively for use in connection with glass drawing apparatus such as is in common use at present, and for employment in apparatus of the kind described in U. S. Letters Patent No. 846,102 issued to me March 5, 1907. Having regard, then, to the first of these forms, A will be seen to designate a hood, preferably constructed of light sheet metal and of generally conical form. With the upper end of this hood connection is had through a pipe $a$ with a suitable source of fluid pressure supply, *e. g.* an air tank, such as is ordinarily employed in connection with apparatus of the class in hand. The size of hood A is such that its lower circular edge is of substantially the diameter of the cylinder which it is desired to draw. To such lower end is secured, in the present instance, detachably, the bait member, B, proper, Figs. 1 and 3. Such bait member, where designed for drawing cylinders, is of course of annular form, corresponding with the edge of the hood in this respect, and consists, in the approved form illustrated, of a hollow pipe section $b$ slit throughout its length on its upper side, as clearly appears in said Fig. 3. Within the hollow interior of the annular member thus provided, and conforming therewith so as to be substantially equidistantly spaced throughout its length from the contacting face of said annular member, is disposed a heating electrical resistance $b'$ such as is ordinarily used in other connections where it is desired to employ an electrical current as a heating agent. While the specific constructional form, or material, of the resistance in question is a matter of indifference forming no part of the present invention, such resistance will ordinarily be constructed in the usual way out of a conductor such as a wire doubled over upon itself and the folds suitably disposed or embedded within annular member $b'$. To retain such folds of the conductor in place an inner layer of insulating material $b^7$ conforming to the inner surface of the annular member aforesaid is provided. Such resistance $b'$ is interposed in a suitable external electrical circuit, flexible connection being had through lead wires $b^2 b^3$ consisting simply of the terminal portions of the conductor just described as constituting the resistance $b'$. The opening on the upper face of the annular pipe section constituting the bait is closed by a covering plate $b^4$ secured laterally to such member on both sides. On the upper face of the plate $b^4$ are provided, at suitable intervals, a plurality of hooks $b^5$ that are adapted to engage with parallel, laterally projecting, lugs $b^6$ on the lower edge of the hood to which it is desired to secure the bait. A latch $b^7$, also mounted on the lower edge of the hood, serves to prevent the bait from being accidentally detached.

The only modification introduced into my second form of bait consists in the substitution for the conical hood A of a cylindrical tube A' of substantially the same diameter throughout. This tube is designed to be drawn upwardly between the same rolls $A^2$ that are employed to subsequently draw the glass cylinder, and that constitute one feature of the invention set up in my patent earlier referred to. The construction of the bait member, B, proper, as will be evident from inspection of Fig. 6, is the same as that shown in connection with the other form of hood. Instead, however, of having it detachably connected with the hood it may be permanently fastened thereto, to which end the cover plate $b^4$ is made in two sections, one adapted to fit within, and the other without, the cylindrical wall of the hood or rather tube A'.

The manner of use of my improved type of bait in connection with the prevailing type of glass drawing apparatus is substantially that followed out in using the ordinary bait. The device is lowered into the bath of metal until the ring, or annular bait member B, is sufficiently immersed therein to cause the metal to cling thereto and to be drawn upwardly when the device is in turn raised. By proper control of the current passing through the heating electrical resistance $b'$ such bait can be maintained at a proper temperature to avoid any danger of the cylinder breaking or cracking off from the bait, which is the most frequent annoyance entailed by the use of the present apparatus. The heat developed by the heating electrical current is not only uniform about the entire periphery of the bait, but reaches the outer surface thereof, which is in actual contact with the glass cylinder being drawn, by conduction from within. The superiority of this method of heating the cap over any method where the heat is applied by radiation at the line of attachment of cylinder to cap or bait should be readily apparent. Such danger of breakage is further decreased by the fact that the bait is of substantially the same diameter as the cylinder being drawn, the hood A forming in effect the cap which has heretofore required to be blown before the drawing operation, proper, could be begun. Such blowing of the cap, as is well understood by those skilled in the art, is quite a delicate operation and any irregular formation thereof entails corresponding malformation of the cylinder with resultant imperfect product. It will furthermore be evident that there is no possibility of the air-opening through the bait becoming clogged, as not infrequently happens where the ordinary bait is used. To gage the temperature of the bait a pyrometer of any standard make suitable for registering the degree of heat involved, may be connected with the interior of annular member B. It is desirable that such temperature be kept above the second point of tension in the glass, that is above the point where the glass comes to a set, glass men generally speaking of glass as having two points of tension, the first point being from 1200 to 1400 degrees F. where vitrification begins to take place, the second point being in the neighborhood of 900 degrees, F. The object in having the bait member detachable from the hood is to facilitate the removal of the completed cylinder. A number of bait members, in other words, may be employed with the single hood, such members being broken off from the cylinder at a later stage in the handling of the latter.

The second form of my bait member involves no variations from the method of operation just described except those fully explained in connection with the special type of drawing apparatus for use in connection with which it is designed.

I should add in conclusion that the annular form in which my improved bait is here illustrated is not only the one which it is capable of assuming; for it is equally well adapted to the drawing of sheets as of cylinders and may be given any desired shape to correspond with the cross-sectional configuration of the article being drawn.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. A bait for drawing glass, comprising a member adapted to be lowered into and raised from the molten glass, and uniform electrical heating means disposed within said member approximately equidistantly throughout from the surface designed to contact with the glass, whereby such contacting surface is heated substantially as described.

2. A bait for drawing glass cylinders, comprising an annular member adapted to be lowered into and raised from the molten glass, and uniform electrical heating means within said member and co-extensive therewith, said means being disposed substantially equidistantly from the face of said member designed for contact with the glass, whereby such face is heated by conduction from within, substantially as described.

3. A bait for drawing glass cylinders, comprising an annular member adapted to be lowered into and raised from the molten glass, the face of said member designed to contact with the glass being transversely curved, and uniform electrical heating means disposed within said member substantially equidistantly from such curved face, whereby such face is heated substantially as described.

4. A bait for drawing glass cylinders, comprising a hollow annular metallic member adapted to be lowered into and raised from the molten glass, the face of said member designed for contact with the glass being of approximately circular cross section, a uniform heating electrical resistance disposed within said member and co-extensive therewith, said resistance being substantially equidistant throughout from such curved face, and external circuit connections for said resistance.

5. A bait for drawing glass cylinders, comprising a hollow iron ring split open on its upper side and of substantially the diameter of the cylinder to be drawn, said ring being adapted to be lowered into and raised from the molten glass, a uniform heating electrical resistance disposed against the inner walls of said ring and extending entirely around the same, whereby the outer surface of said ring designed for contact with the glass is maintained at uniform temperature, and external circuit connections for said resistance.

6. A bait for drawing glass, comprising a hood member provided about its lower edge with a plurality of parallel projecting lugs, and an annular bait member, proper, designed for contact with the glass, said bait member being provided with hooks adapted to engage the lugs on said hood member, whereby the one member may be detachably secured to the other.

7. A bait for drawing glass, comprising a hood of general conical form adapted to provide a cap for the cylinder to be drawn, said hood being provided about its lower edge with a plurality of parallel projecting lugs, fluid pressure connections for said hood, a hollow annular member of the same diameter as the lower edge of said hood and provided with hooks adapted to engage the lugs on the latter whereby said member may be detachably secured to said hood, a heating electrical resistance disposed within said member, and external circuit connections for said resistance.

Signed by me this 10th day of May, 1907.

ROBERT L. FRINK.

Attested by—
MARY ISRAEL,
JNO. F. OBERLIN.